US011866892B2

(12) United States Patent
Hirman

(10) Patent No.: US 11,866,892 B2
(45) Date of Patent: Jan. 9, 2024

(54) EMPTY CONVEYOR SPEED LIMITER

(71) Applicant: Caterpillar Paving Products Inc., Brooklyn Park, MN (US)

(72) Inventor: Colton J. Hirman, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/518,854

(22) Filed: Nov. 4, 2021

(65) Prior Publication Data

US 2023/0135154 A1    May 4, 2023

(51) Int. Cl.
*E01C 23/088* (2006.01)
*E01C 23/12* (2006.01)
*B65G 43/08* (2006.01)

(52) U.S. Cl.
CPC .......... *E01C 23/088* (2013.01); *E01C 23/127* (2013.01); *B65G 43/08* (2013.01); *B65G 2203/0241* (2013.01); *B65G 2203/0258* (2013.01); *B65G 2203/0291* (2013.01); *B65G 2811/095* (2013.01)

(58) Field of Classification Search
CPC ........ B65G 15/24; B65G 43/08; B65G 43/10; B65G 2203/0241; B65G 2203/0258; B65G 2203/0291; B65G 2203/041; B65G 2203/042; B65G 2203/044; B65G 2811/093; B65G 2811/095; B65G 2811/096; E01C 23/088; E01C 23/127
See application file for complete search history.

(56) References Cited

U.S. PATENT DOCUMENTS

| 5,285,887 | A  | * | 2/1994  | Hall ...................... B65G 43/10 |
|           |    |   |         |                           198/572 |
| 8,067,704 | B2 | * | 11/2011 | Lowe ..................... G01G 11/12 |
|           |    |   |         |                           177/121 |
| 9,127,416 | B2 |   | 9/2015  | Klckner |
| 9,464,391 | B2 |   | 10/2016 | Killion et al. |
| 10,161,087 | B1 |   | 12/2018 | Oetken |
| 10,287,104 | B1 |   | 5/2019  | Hogan et al. |
| 10,308,440 | B2 |   | 6/2019  | Marsolek et al. |
| 2016/0060828 | A1 | * | 3/2016 | Killion .................. E01C 23/127 |
|           |    |   |         |                           299/1.5 |

(Continued)

FOREIGN PATENT DOCUMENTS

| DE | 102017000211 A1 | 7/2018 |
| KR | 101389153 B1 | 4/2014 |

*Primary Examiner* — Abby J Flynn
*Assistant Examiner* — Michael A Goodwin
(74) *Attorney, Agent, or Firm* — Schwegman, Lundberg & Woessner, P.A.

(57) ABSTRACT

A cold planer can include a frame; a milling assembly including a drum housing and a cutting rotor located within the drum housing, the drum housing including a discharge port; a primary conveyor coupled to the frame, wherein the primary conveyor is positioned near the discharge port so as to receive material through the discharge port; a secondary conveyor positioned to receive material off an end of the primary conveyor; a sensor associated with the secondary conveyor to sense a load on the secondary conveyor; and a controller configured to receive information from the sensor regarding the load and to control a speed of the secondary conveyor based on the information.

18 Claims, 2 Drawing Sheets

(56) References Cited

U.S. PATENT DOCUMENTS

| | | | |
|---|---|---|---|
| 2016/0177521 A1* | 6/2016 | Laugwitz | E01C 23/088 299/1.5 |
| 2016/0341595 A1* | 11/2016 | Marsolek | G01G 19/00 |
| 2017/0009408 A1* | 1/2017 | Marsolek | E01C 23/065 |
| 2019/0284771 A1 | 9/2019 | Matthews et al. | |

* cited by examiner

EMPTY CONVEYOR SPEED LIMITER

TECHNICAL FIELD

The present disclosure generally relates to a milling machine. More particularly, the present disclosure relates to a conveyor system of a cold planer.

BACKGROUND

Cold planers are powered machines used to remove at least part of a surface of a paved area such as a road, bridge, or parking lot. Typically, cold planers include a frame, a power source, a milling assembly positioned below the frame, and a conveyor system. The milling assembly includes a cutting rotor having numerous cutting bits disposed thereon. As power from the power source is transferred to the milling assembly, this power is further transferred to the cutting rotor, thereby rotating the cutting rotor about its axis. As the rotor rotates, its cutting bits engage the hardened asphalt, concrete, or other materials of an existing surface of a paved area, thereby removing layers of these existing structures. The spinning action of the cutting bits transfers these removed layers to the conveyor system which transports the removed material from a primary conveyor to a secondary conveyor and then to a separate machine such as a haul truck for removal from a work site.

At times the secondary conveyor on a cold planer is left on while the machine is not milling or the secondary conveyor does not have material on it. This unnecessary running of the secondary conveyor can waste fuel and add wear and tear to the conveyor components.

U.S. Pat. No. 10,287,104 discusses a conveyor control system where the speed of the speed of the secondary conveyor can be independently adjustable based on operator input.

SUMMARY

In an example according to this disclosure, a cold planer can include a frame; a milling assembly including a drum housing and a cutting rotor located within the drum housing, the drum housing including a discharge port; a primary conveyor coupled to the frame, wherein the primary conveyor is positioned near the discharge port so as to receive material through the discharge port; a secondary conveyor positioned to receive material off an end of the primary conveyor; a sensor associated with the secondary conveyor to sense a load on the secondary conveyor; and a controller configured to receive information from the sensor regarding the load and to control a speed of the secondary conveyor based on the information.

In one example, a system for controlling a speed of a secondary conveyor of a cold planer can include a sensor associated with the secondary conveyor to sense a load of a material on the secondary conveyor; and a controller configured to receive information from the sensor regarding the load and to control a speed of the secondary conveyor based on the information.

In one example, a method of controlling a secondary conveyor of a cold. planer can include providing a sensor on the secondary conveyor to sense a load of a material on the secondary conveyor; the sensor sending information regarding the load to a controller; and the controller controlling a speed of the secondary conveyor based on the information.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
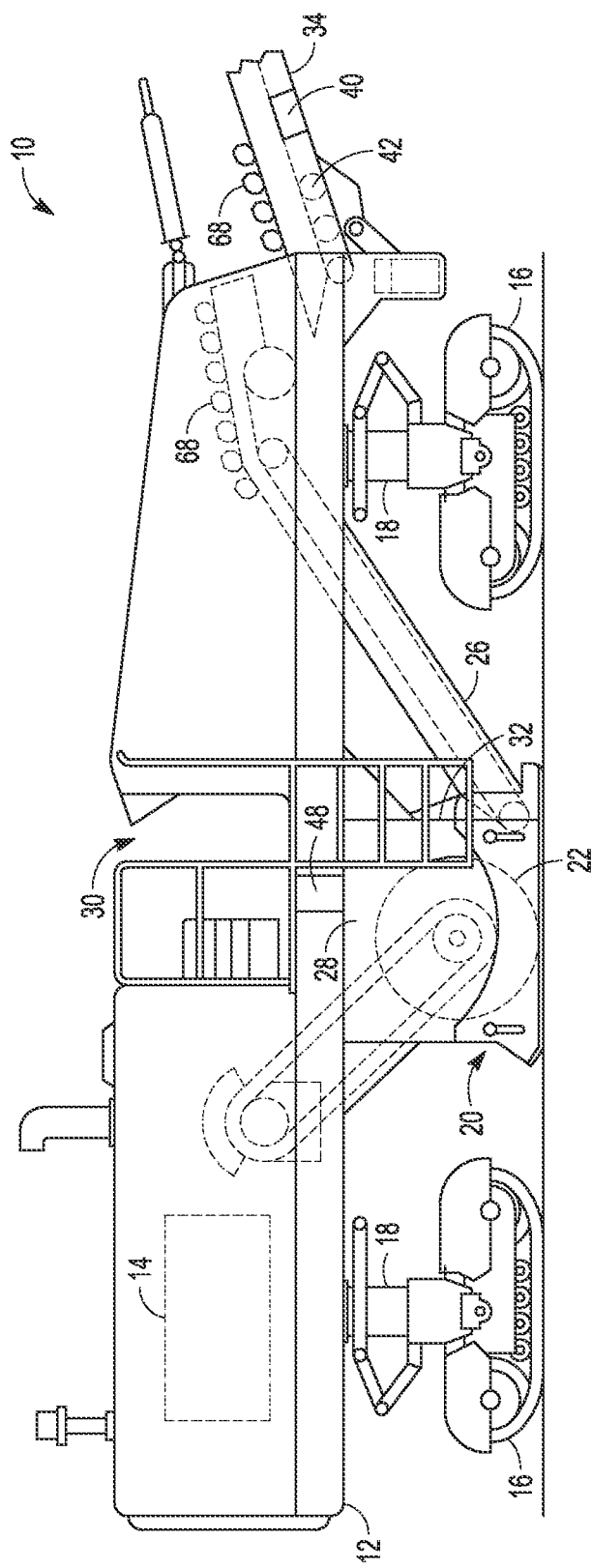
FIG. 1 shows a side view of a cold planer, in accordance with one embodiment.

FIG. 1 shows a side view of a cold planer 10, in accordance with one embodiment. The cold planer 10 includes a frame 12, and a power source 14 connected to the frame 12. The power source 14 may be provided in any number of different forms including, but not limited to, Otto and Diesel cycle internal combustion engines, electric motors, hybrid engines and the like.

The frame 12 is supported by transportation devices 16 via lifting columns 18. The transportation devices 16 may be any kind of ground-engaging device that allows to move the cold planer 10 in a forward direction over a ground surface, for example a paved road or a ground already processed by the cold planer 10. For example, in the shown embodiment, the transportation devices 16 are configured as track assemblies. The lifting columns 18 are configured to raise and lower the frame 12 relative to the transportation devices and the ground.

The cold planer 10 further includes a milling assembly 20 connected to the frame 12. The milling assembly 20 includes a drum housing 28 holding a rotatable cutting rotor 22 operatively connected to the power source 14. The cutting rotor 22 can be rotated about a drum or housing axis extending in a direction perpendicular to the frame axis. As the rotatable cutting rotor 22 spins about its drum axis, cutting bits on the cutting rotor 22 can engage hardened materials, such as, for example, asphalt and concrete, of existing roadways, bridges, parking lots and the like. As the cutting bits engage such hardened. materials, the cutting bits remove layers of these hardened materials. The spinning action of the cutting rotor 22 and its cutting bits then transfers the hardened materials to a primary conveyor 26 via a discharge port 32 on the drum housing 28.

The primary conveyor 26 can be coupled to the frame 12 and located at or near the discharge port 32. The primary conveyor 26 is driven at an operating speed as set by the operator, for example. In some embodiments, the speed of the primary conveyor 26 can be automatically controlled by a controller 48. The primary conveyor 26 transfers the material up to a secondary conveyor 34 positioned to receive material off an end of the primary conveyor 26. The secondary conveyor then transfers the material to a dump truck positioned to receive the material off of the end of the secondary conveyor 34.

The cold planer 10 further includes an operator station or platform 30 including an operator interface for inputting commands to a control system for controlling the cold planer 10, and for outputting information related to an operation of the cold planer 10. A controller 48 can be provided for electrically controlling various aspects of the cold planer 10. For example, the controller 48 can send and receive signals from various components of the cold planer 10 during the operation of the cold planer.

As noted above, at times the secondary conveyor 34 on a cold planer is left on while the machine is not milling or the secondary conveyor 34 does not have material on it. During this time the cold planer machine could be saving fuel and extending conveyor component life by running the secondary conveyor 34 at lower speeds.

The present system utilizes a conveyor material load system that senses weight or volume of material on the secondary conveyor 34. Using this material load information, the controller 48 can determine if the secondary conveyor 34 is loaded or not and can reduce secondary conveyor speed during unloaded times to save on fuel/life etc.

For example, the cold planer 10 can include a sensor 40 associated with the secondary conveyor 34 to sense a load on the secondary conveyor 34. The controller 48 can be configured to receive information from the sensor 40 regarding the load of a material 68 on the second conveyor 34 and to control a speed of the secondary conveyor 34 based on the information. For example, if the sensor 40 detects no load then the controller can be configured. to slow down or stop the secondary conveyor 34. This saves operational costs and wear and tear on the secondary conveyor 34.

In one example, the secondary conveyor 34 can be controlled independently relative to the primary conveyor 26. Accordingly, the primary conveyor 26 continues to operate normally, at a normal operating speed, when the secondary conveyor 34 slows down (or stops). Thus, if the cutting rotor 22. begins cutting again and delivers fresh material 68 to the primary conveyor 26, the primary conveyor 26 will deliver the material 68 to the secondary conveyor 34. The sensor 40 can sense the increased load on the secondary conveyor 34 and the controller 48 can determine that the load has increased and thus, increase the speed of the secondary conveyor 34 up to the normal operating speed.

In one embodiment, the sensor 40 can sense a material weight on the secondary conveyor 34. For example, the sensor 40 can include a strain gauge or a load cell sensor to determine the amount of material weight on the secondary conveyor 34. When the sensor weight information is delivered to the controller 48, the controller 48 can determine from the material weight whether the secondary conveyor 34 is loaded or not.

In one example, the sensor 40 can include a material volume sensor. For example, the sensor 40 can include a smart camera, or radar, or lidar sensors positioned to sense the presence of the material 68 on the secondary conveyor 34. This information is delivered to the controller 48 which is configured to control the speed of the secondary conveyor based on the information. In another embodiment, the sensor 40 can include a light beam sensor that can be directed across a surface of the secondary conveyor 34 to determine the presence of the material 68 on the secondary conveyor 34.

In one embodiment, the sensor 40 can include a strain gauge that can be coupled to one or more pulleys 42 or other structures of the secondary conveyor 34 to determine a load on the secondary conveyor 34. For example, if the pulleys 42 have a high strain on them, the controller 48 can determine that the secondary conveyor 34 is loaded, and if there is a relatively light strain then the controller 48 can determine that the secondary conveyor 34 is unloaded.

As noted, after the secondary conveyor 34 has been slowed down, the primary conveyor 26 remains at its normal operating speed and begins to deliver the material 68 to the secondary conveyor 34 after the cutting rotor begins cutting again, the controller 48 determines that there is a material load on the secondary conveyor 34 and speeds up the secondary conveyor 34. Thus, when the cutting rotor 22 begins turning and cutting again, the cutting rotor 22 will feed the material 68 to the primary conveyor 26 which will then deliver the material 68 onto the secondary conveyor 34. The sensor 40 will pick up the increased load and the controller 48 can determine that a material load is on the secondary conveyor and speed the secondary conveyor 34 up to the proper operating speed.

Figure 2:
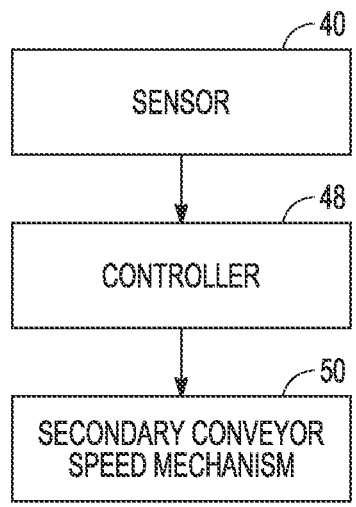
FIG. 2 shows a schematic of a control system for a cold planer, in accordance with one embodiment.

Referring now also to FIG. 2, which shows a schematic of a control system for a cold planer in accordance with one embodiment. The control system generally includes the sensor 40 associated with the secondary conveyor 34 to sense a load of a material on the secondary conveyor 34, and the controller 48 configured to receive information from the sensor 40 regarding the load and to control a speed of the secondary conveyor 34 based on the information by sending speed control instructions to secondary conveyor speed mechanism 50. The secondary conveyor speed mechanism 50 can be any components on the cold planer 10 used for operating the speed of the secondary conveyor 34, such as hydraulics, gears, belts, and other drive components.

In utilizing the present system, the secondary conveyor 34 slows down or stops when the controller 48 determines there is no load on the secondary conveyor 34. The secondary conveyor 34 can be controlled independently relative to the primary conveyor 26 of the cold planer, 10 so that the primary conveyor 26 continues to operate at a normal operating speed when the secondary conveyor 34 slows down. Then, if the primary conveyor 26 begins to deliver material to the secondary conveyor 34 again, the controller 48 can determine that there is a material load on the secondary conveyor 34 and speed up the secondary conveyor 34.

INDUSTRIAL APPLICABILITY

The present system is applicable to a conveyor system for a cold planer. In these applications unnecessary running of the secondary conveyor can waste fuel and add wear and tear to the conveyor components.

Figure 3:
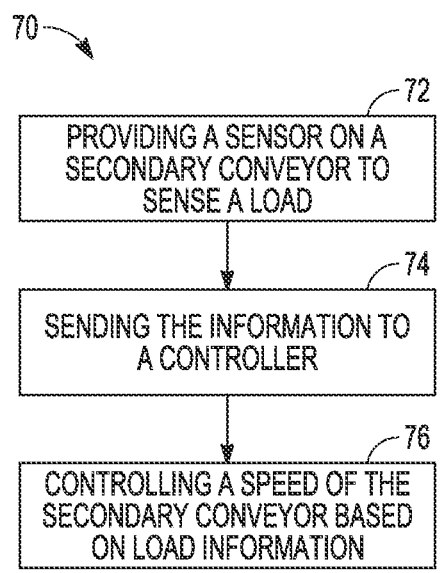
FIG. 3 shows a method of controlling a secondary conveyor, in accordance with one embodiment.

FIG. 3 shows a method (70) of controlling a secondary conveyor, in accordance with one embodiment. The method (70) can include providing a sensor on the secondary conveyor (72) to sense a load of a material on the secondary conveyor; the sensor sending information (74) regarding the load to a controller; and the controller controlling a speed (76) of the secondary conveyor based on the information.

As discussed above, the secondary conveyor can be slowed down or stopped when the controller determines there is no load, as determined by material weight or volume, on the secondary conveyor while the primly conveyor will continue to operate at a normal operating speed (as set by the machine operator) when the secondary controller slows down. When the primary conveyor begins to deliver a material to the secondary conveyor again, the controller determines that there is a material load on the secondary conveyor and speeds up the secondary conveyor.

Overall, the present system concerns an empty conveyor speed limiter. According to the system, a conveyor material load sensor can sense weight or volume of material on the secondary conveyor. Using the sensed information, the controller can determine if the belt is loaded or not and can reduce secondary conveyor speed during unloaded times to save on fuel/life and extending conveyor component life. The primary conveyor can remain at the speed set by the operator. In the case of the machine starting in a cut again the primary conveyor would still load the secondary conveyor at the same pace as usual, which would then trigger the secondary conveyor to run after the sensor and controller determines weight or volume present on the second conveyor.

Various examples are illustrated in the figures and foregoing description. One or more features from one or more of these examples may be combined to form other examples.

The above detailed description is intended to be illustrative, and not restrictive. The scope of the disclosure should, therefore, be determined with references to the appended claims, along with the full scope of equivalents to which such claims are entitled.

What is claimed is:

1. A cold planer comprising:
a frame;
a milling assembly coupled to the frame, the milling assembly including a drum housing and a cutting rotor located within the drum housing, the drum housing including a discharge port;
a primary conveyor coupled to the frame, wherein the primary conveyor is positioned near the discharge port so as to receive a material through the discharge port;
a secondary conveyor positioned to receive the material off an end of the primary conveyor;
a sensor associated with the secondary conveyor to sense a load on the secondary conveyor; and
a controller configured to receive information from the sensor regarding the load and to control a speed of the secondary conveyor based on the information such that the secondary conveyor stops moving when the controller determines that there is no load on the secondary conveyor and when the controller determines that there is a load on the secondary conveyor the controller speeds up the secondary conveyor.

2. The cold planer of claim 1, wherein the secondary conveyor is controlled independently relative to the primary conveyor.

3. The cold planer of claim 1, wherein the primary conveyor continues to operate when the secondary conveyor stops moving.

4. The cold planer of claim 1, wherein the sensor senses a material weight on the secondary conveyor.

5. The cold planer of claim 4, wherein the controller determines from the material weight whether the secondary conveyor is loaded or not.

6. The cold planer of claim 1, wherein the sensor senses a volume of material on the secondary conveyor.

7. The cold planer of claim 1, wherein when the primary conveyor begins to deliver material to the secondary conveyor, the controller determines that there is a material load on the secondary conveyor and speeds up the secondary conveyor.

8. A system for controlling a speed of a secondary conveyor of a cold planer, the system comprising:
a sensor associated with the secondary conveyor to sense a load of a material on the secondary conveyor; and
a controller configured to receive information from the sensor regarding the load and to control a speed of the secondary conveyor based on the information such that the secondary conveyor stops moving when the controller determines that there is no load on the secondary conveyor and when the controller determines that there is a load on the secondary conveyor the controller speeds up the secondary conveyor.

9. The system of claim 8, wherein the secondary conveyor is controlled independently relative to a primary conveyor of the cold planer.

10. The system of claim 9, wherein the primary conveyor continues to operate at an operating speed when the secondary conveyor stops moving.

11. The system of claim 10, wherein when the primary conveyor begins to deliver a material to the secondary conveyor, the controller determines that there is a material load on the secondary conveyor and speeds up the secondary conveyor.

12. The system of claim 8, wherein the sensor senses a material weight on the secondary conveyor.

13. The system of claim 12, wherein the controller determines from the material weight whether the secondary conveyor is loaded or not.

14. The system of claim 8, wherein the sensor senses a volume of material on the secondary conveyor.

15. A method of controlling a secondary conveyor of a cold planer, the method comprising:
providing a sensor on the secondary conveyor to sense a load of a material on the secondary conveyor;
the sensor sending information regarding the load to a controller; and
the controller controlling a speed of the secondary conveyor based on the information such that the secondary conveyor stops moving when the controller determines that there is no load on the secondary conveyor and when the controller determines that there is a load on the secondary conveyor the controller speeds up the secondary conveyor.

16. The method of claim 15, wherein the secondary conveyor stops moving when the controller determines there is no load on the secondary conveyor while a primary conveyor continues to operate at an operating speed when the secondary conveyor stops moving.

17. The method of claim 16, wherein when the primary conveyor begins to deliver a material to the secondary conveyor, the controller determines that there is a material load on the secondary conveyor and speeds up the secondary conveyor.

18. The method of claim 15, wherein the sensor senses a material weight or a volume of material on the secondary conveyor.

* * * * *